(12) United States Patent
Hatakeyama et al.

(10) Patent No.: US 10,428,407 B2
(45) Date of Patent: Oct. 1, 2019

(54) CYLINDRICAL MEMBER MADE OF FLAKE GRAPHITE CAST IRON

(71) Applicants: TPR CO., LTD., Tokyo (JP); TPR INDUSTRY CO., LTD., Sagae-shi, Yamagata (JP)

(72) Inventors: Koichi Hatakeyama, Yamagata (JP); Akira Sayama, Yamagata (JP); Akira Sato, Yamagata (JP)

(73) Assignees: TPR CO., LTD., Tokyo (JP); TPR INDUSTRY CO., LTD., Sagae-shi, Yamagata (JP)

( * ) Notice: Subject to any disclaimer, the term of this patent is extended or adjusted under 35 U.S.C. 154(b) by 277 days.

(21) Appl. No.: 15/521,554

(22) PCT Filed: Sep. 5, 2016

(86) PCT No.: PCT/JP2016/075980
§ 371 (c)(1),
(2) Date: Apr. 24, 2017

(87) PCT Pub. No.: WO2018/042654
PCT Pub. Date: Mar. 8, 2018

(65) Prior Publication Data
US 2019/0093203 A1    Mar. 28, 2019

(51) Int. Cl.
*C22C 37/08* (2006.01)
*C22C 37/10* (2006.01)
(Continued)

(52) U.S. Cl.
CPC .............. *C22C 37/10* (2013.01); *C22C 37/00* (2013.01); *C22C 37/08* (2013.01); *F02F 1/00* (2013.01);
(Continued)

(58) Field of Classification Search
CPC ................................ C22C 37/08; C22C 37/10
See application file for complete search history.

(56) References Cited

U.S. PATENT DOCUMENTS 2,924,303 A    2/1960  Sampson
5,242,510 A    9/1993  Begin
(Continued)

FOREIGN PATENT DOCUMENTS

CN    1033844 A    7/1989
CN    1167883 C    9/2004
(Continued)

OTHER PUBLICATIONS

Search Report for European Patent Application No. 16854619.0, dated Jul. 12, 2018.
(Continued)

*Primary Examiner* — Cam N. Nguyen
(74) *Attorney, Agent, or Firm* — Merchant & Gould P.C.

(57) ABSTRACT

Provided is a cylindrical member made of flake graphite cast iron that has practical processability as well as excellent mechanical strength and further is excellent in abrasion resistance and seizing resistance. Specifically, provided is a cylindrical member made of flake graphite cast iron, the flake graphite cast iron including a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, and the balance of Fe and inevitable impurities.

20 Claims, 5 Drawing Sheets

(51) Int. Cl.
*C22C 37/00* (2006.01)
*F02F 1/00* (2006.01)
*F16J 10/00* (2006.01)
*F16D 65/10* (2006.01)
*F16D 65/08* (2006.01)

(52) U.S. Cl.
CPC .............. *F02F 1/004* (2013.01); *F16D 65/08* (2013.01); *F16D 65/10* (2013.01); *F16J 10/00* (2013.01)

(56) References Cited

U.S. PATENT DOCUMENTS

| | | | |
|---|---|---|---|
| 5,972,128 A * | 10/1999 | Miwa | C21D 5/00 148/321 |
| 7,083,685 B1 * | 8/2006 | Katori | C22C 37/10 148/321 |
| 9,044,807 B2 * | 6/2015 | Oda | B21B 27/032 |
| 9,221,232 B2 * | 12/2015 | Oda | B22D 13/02 |
| 9,239,111 B2 | 1/2016 | Xue et al. | |
| 9,358,758 B2 * | 6/2016 | Oda | C22C 37/00 |
| 9,718,106 B2 * | 8/2017 | Hattori | B22D 13/02 |
| 9,724,740 B2 * | 8/2017 | Oda | B22D 13/026 |
| 9,815,098 B2 * | 11/2017 | Hattori | B22D 13/02 |
| 2011/0132314 A1 | 6/2011 | Müller et al. | |
| 2017/0159148 A1 * | 6/2017 | Barnes | C21D 9/40 |

FOREIGN PATENT DOCUMENTS

| | | |
|---|---|---|
| CN | 1653202 A | 8/2005 |
| CN | 102015158 A | 4/2011 |
| CN | 103131945 A | 6/2013 |
| CN | 103667861 A | 3/2014 |
| JP | S55-51988 A | 4/1980 |
| JP | 57-194241 A | 11/1982 |
| JP | S60-247036 A | 12/1985 |
| JP | H02-25540 A | 1/1990 |
| JP | 02-258952 A | 10/1990 |
| JP | H06-184692 A | 7/1994 |
| JP | 2002-105581 A | 4/2002 |
| JP | 2006-206986 A | 8/2006 |
| JP | 2014-062318 A | 4/2014 |
| JP | 2014-189824 A | 10/2014 |
| KR | 2014-0029284 A | 3/2014 |

OTHER PUBLICATIONS

Office Action for Chinese Patent Application No. 201680003114.9, dated Aug. 14, 2018.

* cited by examiner

CYLINDRICAL MEMBER MADE OF FLAKE GRAPHITE CAST IRON

This application is a National Stage of PCT/JP2016/075980, filed Sep. 5, 2016, which application is incorporated herein by reference. To the extent appropriate, a claim of priority is made to above disclosed application.

TECHNICAL FIELD

The present invention relates to a cylindrical member made of flake graphite cast iron.

BACKGROUND

Cast iron members excellent in lubricating action of graphite present in abase have been widely used as members required to have abrasion resistance, such as a cylinder liner for an internal combustion engine, a brake drum, and an elevator component (Patent Literatures 1 and 2, etc.). As the cast iron members, members having various compositions, structures, and physical properties have been proposed. As members made of flake graphite cast iron, there are given, for example, members exemplified in Patent Literatures 1 and 2.

In Patent Literature 1, there is proposed an elevator component made of flake graphite cast iron which has a tensile strength of 250 MPa or more and a base hardness of 250 HV or more and which includes a composition containing, in terms of mass %, 2.70% to 3.90% of C, 1.20% to 2.80% of Si, 1.00% to 3.20% of Mn, and the balance of Fe and inevitable impurities, and a structure having a carbide dispersed in an amount of 6.0% or less in terms of an area ratio. Therefore, an elevator component that is excellent in mechanical strength and machinability and can be manufactured easily at low cost can be provided.

Further, in Patent Literature 2, there is proposed a cylinder liner for a ship engine made of flake graphite cast iron which has a thickness of from 30 mm to 350 mm and a tensile strength of 250 MPa or more and which includes a composition containing, in terms of mass %, 2.4% to 3.6% of C, 0.8% or more and less than 2.8% of Si, 1.1% to 3.0% of Mn, 0.01% to 0.6% of P, 0.001% to 0.2% of B, and the balance of Fe and inevitable impurities, and a structure having a carbide dispersed in an amount of 8% or less in terms of an area ratio. Therefore, an inexpensive cylinder liner for a ship engine having a large thickness and high strength can be provided.

CITATION LIST

Patent Literature

[PTL 1] JP 2014-189824 A
[PTL 2] JP 2014-62318 A

SUMMARY OF INVENTION

Technical Problem

Meanwhile, it is also important that, in the cast iron member to be used as a member required to have abrasion resistance, seizing of a sliding surface be less liable to occur. In addition, when the cast iron member is also required to be reduced in weight and thickness, it is necessary that processability be ensured to such a degree that productivity is not impaired while the mechanical strength for satisfying those requirements be ensured.

The present invention has been made in view of the above-mentioned circumstances, and it is an object of the present invention to provide a cylindrical member made of flake graphite cast iron that has practical processability as well as excellent mechanical strength and further is excellent in abrasion resistance and seizing resistance.

Solution to Problem

The above-mentioned object can be achieved by the following embodiments of the present invention. That is, according to a first aspect of the present invention, there is provided a cylindrical member made of flake graphite cast iron, the flake graphite cast iron including a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, and the balance of Fe and inevitable impurities.

According to a second aspect of the present invention, there is provided a cylindrical member made of flake graphite cast iron, the flake graphite cast iron including a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, more than 0% and 0.6% or less of another element except C, Si, Mn, P, S, Cr, Mo, Ni, and Fe, and the balance of Fe and inevitable impurities.

In one embodiment of the cylindrical member made of flake graphite cast iron according to the second aspect of the present invention, it is preferred that the another element include Cu, and the flake graphite cast iron include, in terms of mass %, 0.05% or more and 0.55% or less of Cu.

In other embodiments of the cylindrical members made of flake graphite cast iron according to the first and second aspects of the present invention, it is preferred that the flake graphite cast iron have a structure containing at least one kind of base selected from the group consisting of pearlite and bainite.

In other embodiments of the cylindrical members made of flake graphite cast iron according to the first and second aspects of the present invention, it is preferred that the flake graphite cast iron include, in terms of mass %, 0.20% or more and 0.55% or less of Mo.

In other embodiments of the cylindrical members made of flake graphite cast iron according to the first and second aspects of the present invention, it is preferred that i) the flake graphite cast iron include, in terms of mass %, 0.30% or more and 0.55% or less of Mo, and that ii) the flake graphite cast iron include, in terms of mass %, a total of 0.60% or more and 1.15% or less of Mo and Ni.

In other embodiments of the cylindrical members made of flake graphite cast iron according to the first and second aspects of the present invention, it is preferred that the cylindrical member have a thickness of 3.5 mm or less.

In other embodiments of the cylindrical members made of flake graphite cast iron according to the first and second aspects of the present invention, it is preferred that the flake graphite cast iron have a hardness of 102 HRB or more and 112 HRB or less, a tensile strength of 300 MPa or more, and a Young's modulus of 110 GPa or more.

In other embodiments of the cylindrical members made of flake graphite cast iron according to the first and second aspects of the present invention, it is preferred that the flake graphite cast iron include a carbide, and the carbide have an area ratio of 0.9% or more and 5.0% or less in a continuous region that continues by 0.2 mm or more with respect to a radial direction of the cylindrical member.

In other embodiments of the cylindrical members made of flake graphite cast iron according to the first and second aspects of the present invention, it is preferred that the continuous region have a length of 2.7 mm or less with respect to the radial direction of the cylindrical member.

In other embodiments of the cylindrical members made of flake graphite cast iron according to the first and second aspects of the present invention, it is preferred that the cylindrical member include an inner peripheral surface and an outer peripheral surface, any one of the inner peripheral surface and the outer peripheral surface being formed in an end portion on one side of the continuous region with respect to the radial direction of the cylindrical member.

In other embodiments of the cylindrical members made of flake graphite cast iron according to the first and second aspects of the present invention, it is preferred that the cylindrical member include a cylinder liner for an internal combustion engine in which the inner peripheral surface is formed on an innermost peripheral side of the continuous region with respect to the radial direction of the cylindrical member, and a piston and a piston ring reciprocate and slide on the inner peripheral surface.

In other embodiments of the cylindrical members made of flake graphite cast iron according to the first and second aspects of the present invention, it is preferred that the cylindrical member include a brake drum of an internally expanding drum brake in which the inner peripheral surface is formed on an innermost peripheral side of the continuous region with respect to the radial direction of the cylindrical member, and the brake drum slides on a brake shoe on the inner peripheral surface.

Advantageous Effects of Invention

According to the present invention, it is possible to provide the cylindrical member made of flake graphite cast iron that has practical processability as well as excellent mechanical strength and further is excellent in abrasion resistance and seizing resistance.

BRIEF DESCRIPTION OF DRAWINGS

FIG. 2 are each a schematic view for illustrating an example of the case in which the cylindrical members made of flake graphite cast iron of the first and second inventions are used as a cylinder liner. FIG. 2c is an enlarged sectional view for illustrating an example of a sectional structure taken along the line IIC-IIC of FIG. 2a.

DESCRIPTION OF EMBODIMENTS

A cylindrical member made of flake graphite cast iron according to a first embodiment of the present invention is a cylindrical member made of flake graphite cast iron, the flake graphite cast iron including a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, and the balance of Fe and inevitable impurities. The cylindrical member made of flake graphite cast iron according to the first embodiment using the flake graphite cast iron having such composition has practical processability as well as excellent mechanical strength and further is excellent in abrasion resistance and seizing resistance.

Now, the composition and structure of flake graphite cast iron (hereinafter sometimes simply abbreviated as "cast iron") to be used in the cylindrical member made of flake graphite cast iron according to the first embodiment and a cylindrical member made of flake graphite cast iron according to a second embodiment of the present invention to be described later are described in detail. In the following description, when matters that are common to both the cylindrical member made of flake graphite cast iron according to the first embodiment and the cylindrical member made of flake graphite cast iron according to the second embodiment to be described later are mentioned, such cylindrical member is referred to as the cylindrical member made of flake graphite cast iron or cylindrical member of this embodiment. Further, the content of each element represented in the unit of "%" means mass % unless otherwise stated.

C is an element that serves to accelerate the generation of pearlite serving as a base structure, increase the strength of cast iron, and form flake graphite, to thereby enhance a self-lubricating property. Further, C causes a carbide to precipitate, to thereby enhance abrasion resistance and seizing resistance. In order to attain such effects, the content of C needs to be 2.85% or more. Meanwhile, when the content of C is too large, crystallization of graphite increases, with the result that sufficient tensile strength may not be obtained. Therefore, the content of C needs to be 3.35% or less. It is preferred that the content of C be 2.90% or more and 3.20% or less.

Si is an element that contributes to the crystallization of graphite in cast iron. In order to crystallize graphite in an appropriate amount, the content of Si needs to be 1.95% or more. Meanwhile, when the content of Si is too large, ferrite is liable to precipitate to decrease strength, with the result that sufficient tensile strength may not be obtained. Therefore, the content of Si needs to be 2.55% or less. It is preferred that the content of Si be 2.00% or more and 2.45% or less.

Mn is an element that serves to miniaturize graphite and stabilize pearlite when the pearlite is generated as a base structure. Further, Mn is chemically combined with S to generate MnS in a hot metal, to thereby enhance the cutting property of flake graphite cast iron. In order to attain such effects, the content of Mn needs to be 0.45% or more. Meanwhile, when the content of Mn is too large, the crystallization of graphite is inhibited, and the friction characteristics are degraded. Therefore, the content of Mn needs to be 0.8% or less.

P is an element that increases the hardness of cast iron and causes steadite (ternary eutectic structure of $Fe_3P$, $Fe_3C$, and Fe) to precipitate, to thereby contribute to the abrasion resistance. When the content of P is too large, a coarse steadite phase is formed to cause an increase in aggressiveness to a partner member and a decrease in toughness and processability. Therefore, the content of P needs to be 0.25% or less. Meanwhile, there is no particular limitation on the lower limit value of the content of P, but even when P is not added intentionally, P is contained as an inevitable impurity in cast iron in an amount of at least about 0.03% Thus, it is only necessary that the content of P be 0.03% or more. Further, it is preferred that the content of P be 0.05% or more and 0.20% or less.

S is an element that is bonded to Mn to form MnS in a hot metal, to thereby contribute to the enhancement of the cutting property of cast iron. When the content of S is too large, cast iron becomes brittle, with the result that desired strength may not be ensured. Therefore, the content of S needs to be 0.15% or less. Meanwhile, there is no particular limitation on the lower limit value of the content of S, but even when S is not added intentionally, S is contained as an inevitable impurity in cast iron in an amount of at least about 0.03%. It is preferred that the content of S be 0.03% or more and 0.10% or less.

Cr is an element that makes the base dense to strengthen the base, to thereby increase the strength and hardness of cast iron, and exhibits the effect of enhancing oxidation resistance. In order to attain such effects, the content of Cr needs to be 0.15% or more. Meanwhile, when the content of Cr is too large, the toughness and processability are decreased. Therefore, the content of Cr needs to be 0.55% or less. It is preferred that the content of Cr be 0.25% or more and 0.55% or less.

Mo is dissolved in solid in the base to strengthen the base, to thereby increase the hardness, in particular, tensile strength of cast iron. Mo serves to miniaturize pearlite when the pearlite is generated to reduce the section sensitivity of a cylindrical member that is a cast metal, to thereby reduce the difference between the mechanical properties in an outer peripheral portion and the mechanical properties in an inner peripheral portion to homogenize the outer peripheral portion and the inner peripheral portion. Further, Mo serves to accelerate the precipitation of a carbide, and the carbide enhances seizing resistance. In order to attain such effects, the content of Mo needs to be 0.15% or more. Meanwhile, when the content of Mo is too large, the toughness is decreased, and the hardness is increased excessively, with the result that the processability is also decreased. Therefore, the content of Mo needs to be 0.65% or less. The content of Mo is preferably 0.20% or more and 0.65% or less from the viewpoint of seizing resistance and is preferably 0.15% or more and 0.55% or less from the viewpoint of processability. Further, the content of Mo is more preferably 0.20% or more and 0.55% or less from the viewpoints of seizing resistance and processability and is most preferably 0.30% or more and 0.55% or less from the viewpoint of enhancement of the tensile strength.

Ni makes the base dense to strengthen the base, to thereby accelerate graphitization. Further, Ni serves to miniaturize and uniformize graphite to reduce the section sensitivity of a cylindrical member that is a cast, to thereby reduce the difference between the mechanical properties in an outer peripheral portion and the mechanical properties in an inner peripheral portion to homogenize the outer peripheral portion and the inner peripheral portion. Ni also serves to enhance a Young's modulus. In order to attain such effects, it is preferred that the content of Ni be 0.15% or more. Meanwhile, when the content of Ni is too large, the above-mentioned effects are saturated along with an increase in content of Ni. Therefore, the content of Ni is set to 0.65% or less. The content of Ni is preferably 0.25% or more and 0.65% or less from the viewpoint of enhancement of a Young's modulus.

Regarding Mo and Ni, it is preferred that the total content of Mo and Ni be 0.3% or more and 1.30% or less. When the total content of Mo and Ni is set to fall within the above-mentioned range, it becomes significantly easy to ensure abrasion resistance and seizing resistance simultaneously while enhancing a tensile strength and a Young's modulus. Further, in order to ensure processability simultaneously while enhancing a tensile strength and a Young's modulus, it is more preferred that i) the content of Mo be 0.30% or more and 0.55% or less, and ii) the total content of Mo and Ni be 0.60% or more and 1.15% or less.

The balance other than the above-mentioned C, Si, Mn, P, S, Cr, Mo, and Ni contains Fe and inevitable impurities.

Meanwhile, it is preferred that the structure of the flake graphite cast iron contain at least one kind of base selected from the group consisting of pearlite and bainite. Further, in general, the structure of the flake graphite cast iron also contains graphite and a carbide. The structure of the flake graphite cast iron may be appropriately controlled by adjusting the composition to fall within the above-mentioned range.

Further, the base contains at least one kind selected from the group consisting of pearlite and bainite, and may further contain a small amount of phases other than pearlite and bainite. As the other phases, there is given, for example, ferrite. When ferrite is contained in the base, it is preferred that the area ratio of ferrite be 5% or less. Further, it is preferred that the base not contain a chilled phase (phase that is cementite). Of the group consisting of pearlite and bainite, (I) only pearlite may be contained in the base, (II) both pearlite and bainite may be contained in the base, and (III) only bainite may be contained in the base.

Figure 1:
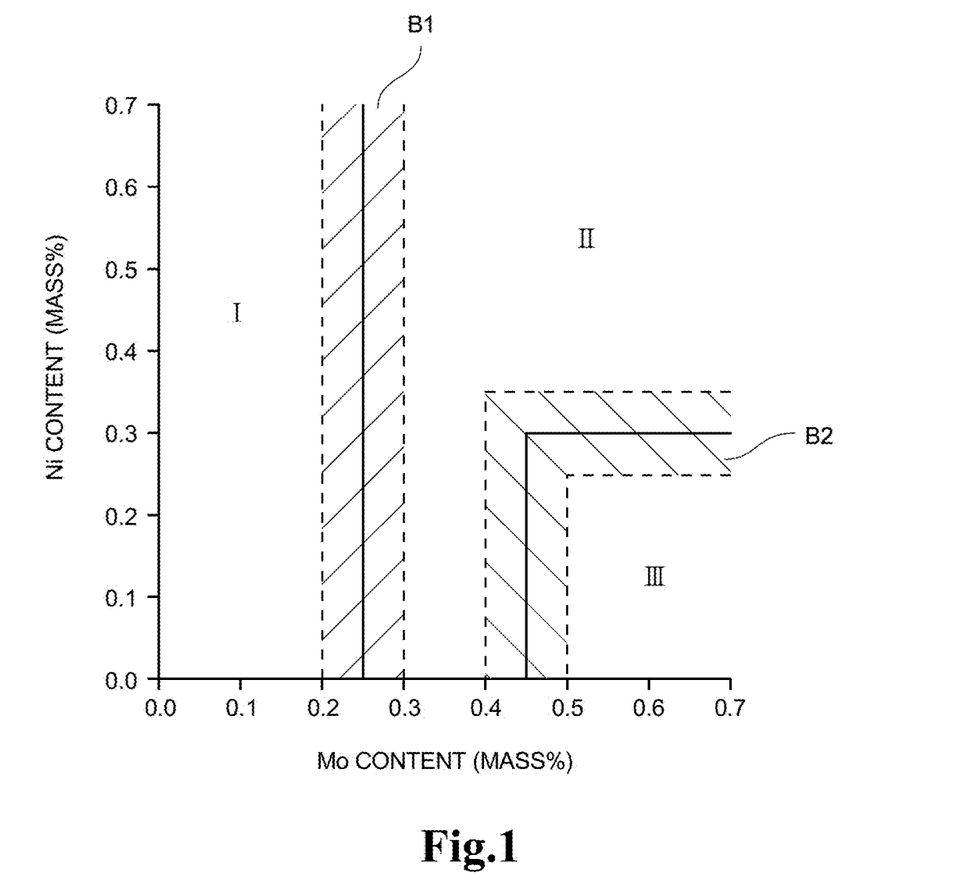
FIG. 1 is a graph for showing a relationship between the contents of Mo and Ni in flake graphite cast iron to be used in cylindrical members made of flake graphite cast iron of the first and second inventions and a base structure.

The base may be controlled to any of the base structure (I) to the base structure (III), for example, by setting the contents of Mo and Ni as shown in FIG. 1. FIG. 1 is a graph for showing a relationship between the contents of Mo and Ni and the base structure. In FIG. 1, the horizontal axis represents the content (%) of Mo, and the vertical axis represents the content (%) of Ni. As shown in FIG. 1, such a range that the content of Mo is about 0.25±0.05% is set to a boundary (first boundary area B1). In this case, in a region (first region I) in which the content of Mo is small, it is easy to control the base to the base structure (I). In contrast, in a region (second region II) in which the content of Mo is large, it is easy to control the base to the base structure (II).

In a region in which the content of Mo is larger than that in the first boundary area B1, such a range that the content of Ni is about 0.30±0.05% at a content of Mo of 0.40% or more and such a range that the content of Mo is about 0.45±0.05% at a content of Ni of 0.35% or less are set to a boundary (secondary boundary area B2). In this case, in a region (second region II) in which the content of Mo is small or the content of Ni is large, it is easy to control the base to the base structure (II). In contrast, in a region (third region III) in which the content of Mo is large, and the content of Ni is small, it is easy to control the base to the base structure (III).

In the base, fine flake graphite is dispersed. There is no particular limitation on the size of graphite, but graphite has a size of, for example, from about 4 to about 8 (ISO 945-1:2008). Further, there is no particular limitation on the area ratio of graphite, but the area ratio is generally about 6.0% or more and about 17.0% or less, preferably 8.0% or more and 15.0% or less. The area ratio of graphite may be controlled by the content of Mo. The reason for this is as follows. In the flake graphite cast iron having a composition not containing Mo, a C component tends to be crystallized as graphite or dissolved in solid in the base without forming a carbide. However, in a composition containing Mo, the C component forms a carbide containing Mo and P, and hence the crystallization as graphite is reduced.

Further, the flake graphite cast iron contains a carbide as described above. The carbide forms a primary sliding surface when the cylindrical member of this embodiment and a partner member slide on each other. Therefore, even when the base has a miniaturized graphite structure, the carbide can suppress the degradation of sliding characteristics. Here, in a continuous region that continues by 0.2 mm or more with respect to a radial direction (thickness direction) of the cylindrical member, the area ratio of the carbide is preferably 0.9% or more and 5.0% or less from the viewpoints of abrasion resistance and seizing resistance. When the area ratio of the carbide is set to 0.9% or more, it becomes significantly easy to enhance abrasion resistance and seizing resistance as the sliding surface that slides in contact with a partner member. Meanwhile, when the area ratio of the carbide is too large, the processability of cast iron is decreased. Therefore, it is preferred that the area ratio of the carbide be 5.0% or less. The area ratio of the carbide in the continuous region is preferably 1.5% or more and 5.0% or less from the viewpoints of abrasion resistance and seizing resistance, preferably 0.9% or more and 4.2% or less from the viewpoint of processability, more preferably 1.5% or more and 4.2% or less from the viewpoints of abrasion resistance, seizing resistance, and processability. Further, in the cylindrical member of this embodiment, the area ratio of the carbide increases from the outer peripheral side to the inner peripheral side in the radial direction (thickness direction). Thus, the length of the continuous region in the radial direction (thickness direction) may be appropriately selected within a range not exceeding the maximum thickness of the cylindrical member, and the upper limit value of the length in the radial direction is not particularly limited but is preferably set to 2.7 mm or less from the practical viewpoint.

The cylindrical member of this embodiment is manufactured by centrifugal casting using a cylindrical mold. Therefore, an outer peripheral surface and an inner peripheral surface of the cylindrical member immediately after casting are formed of casting surfaces. Thus, it is preferred that the inner peripheral surface or the outer peripheral surface formed of a casting surface be subjected to processing such as cutting processing so that anyone selected from the inner peripheral surface and the outer peripheral surface after processing is formed in an end portion on one side of the continuous region with respect to the radial direction of the cylindrical member. When the inner peripheral surface or the outer peripheral surface after processing formed in the end portion on one side of the continuous region is used as a sliding surface that slides on a partner member, more excellent abrasion resistance and seizing resistance can be obtained. The "end portion on one side of the continuous region" refers to an innermost peripheral side of the continuous region when the inner peripheral surface (casting surface) is subjected to processing, and refers to an outermost peripheral surface of the continuous region when the outer peripheral surface (casting surface) is processed.

Further, when the inner peripheral surface formed of a casting surface after processing such as cutting processing is formed on the innermost peripheral side of the continuous region with respect to the radial direction of the cylindrical member, the cylindrical member made of flake graphite cast iron of this embodiment can be used as a member that is caused to slide the inner peripheral surface as a sliding surface on a partner member. Specific examples of applications thereof are described as follows. It is particularly preferred that the cylindrical member made of flake graphite cast iron of this embodiment be a cylinder liner for an internal combustion engine in which a piston and a piston ring reciprocate and slide on the inner peripheral surface, or a brake drum of an internally expanding drum brake in which the brake drum slides on a brake shoe on the inner peripheral surface.

Further, when the inner peripheral surface (sliding surface) is formed on the innermost peripheral side of the continuous region, the outer peripheral surface formed of a casting surface may also be subjected to cutting processing or the like as necessary so as to form a new outer peripheral surface (processed surface). For example, as disclosed in JP 5815262 B2, when the cylindrical member is integrally molded so as to be inserted into a cylinder block, the outer peripheral surface of the cylindrical member is formed into a complicated shape by cutting processing in order to increase the bonding strength between the cylindrical member and the cylinder block. The thickness of the cylindrical member when the outer peripheral surface has a complicated shape refers to a thickness based on a deepest recessed portion of the outer peripheral surface. In this case, the new outer peripheral surface may be a surface forming the outermost peripheral side of the continuous region or may be a surface formed in a region on a further outer side from the outermost peripheral side of the continuous region.

Further, when the inner peripheral surface (sliding surface) is formed on the innermost peripheral side of the continuous region, the cylindrical member including the inner peripheral surface (sliding surface) and the outer peripheral surface formed of a casting surface may be used as a member depending on each application, such as a cylinder liner for an internal combustion engine or a brake drum. For example, when the surface roughness of the outer peripheral surface formed of a casting surface is increased or when a plurality of protrusions are formed on the outer peripheral surface formed of a casting surface in order to enhance the joint strength with respect to a member (outer peripheral side member) arranged so as to cover the outer peripheral side of the cylindrical member, it is preferred that the cylindrical member including the inner peripheral surface (sliding surface) and the outer peripheral surface formed of a casting surface be directly used as a member depending on each application. As the case where the surface roughness of the casting surface is increased, there is given, for example, JP 3253605 B2, and as the case where a plurality of protrusions are formed on the outer peripheral surface, there are given, for example, JP 4210468 B2 and JP 4429025 B2. The thickness of the cylindrical member when the surface roughness of the outer peripheral surface formed of a casting surface is large refers to a thickness based on a valley portion of the surface roughness. Further, the thickness of the cylindrical member when the protrusions are formed refers to a thickness based on an outer peripheral base surface without protrusions.

When the inner peripheral surface (sliding surface) is formed on the innermost peripheral side of the continuous region, or when the outer peripheral surface (sliding surface) is formed on the outermost peripheral side of the continuous region, it is preferred that the length of the continuous region in the radial direction (thickness direction) be also 0.2 mm or more. With this, more excellent abrasion resistance and seizing resistance can be easily obtained on the inner peripheral surface or the outer peripheral surface that serves as a sliding surface. The length of the continuous region in the radial direction may be appropriately selected depending on the application of the cylindrical member of this embodiment within the range not exceeding the maximum thickness of the cylindrical member in a completed state as a member for each application, as long as the length of the continuous region in the radial direction is 0.2 mm or more. The length of the continuous region in the radial direction is set to more preferably 0.7 mm or more, still more preferably 1.4 mm or more depending on an increase in thickness. There is no particular limitation on the upper limit value of the length in the radial direction, but the length in the radial direction is preferably 2.7 mm or less from the practical viewpoint. When the inner peripheral surface (sliding surface) or the outer peripheral surface (sliding surface) that is newly formed by cutting processing or the like is also subjected to surface modification treatment, such as laser hardening, the length of the continuous region in the radial direction (thickness direction) refers to a length measured based on the state before the surface modification treatment is performed.

The cutting processing of the inner peripheral surface and the outer peripheral surface formed of casting surfaces may be performed only once or may be performed twice or more separately. Further, the length of the continuous region in the radial direction (thickness direction) based on the thickness (100%) in the cylindrical member immediately after casting including the inner peripheral surface and the outer peripheral surface formed of casting surfaces is preferably 34% or more, more preferably 49% or more.

In the cylindrical member of this embodiment, at least the inner peripheral surface (casting surface) is subjected to cutting processing for the purpose of removing blow holes after centrifugal casting. The machining allowance of the cutting processing for this purpose may be set to, for example, from 1.5 mm to 3.5 mm. Further, the thickness of the cylindrical member immediately after centrifugal casting, in which the outer peripheral surface (casting surface) is to be also subjected to cutting processing, is set to be larger by the machining allowance required for cutting processing of the outer peripheral surface (casting surface) with respect to the thickness of the cylindrical member immediately after centrifugal casting in which the outer peripheral surface (casting surface) is not subjected to cutting processing. The machining allowance of the cutting processing for this purpose may be set to, for example, from 1.5 mm to 3.5 mm.

When the cylindrical member of this embodiment is used as a cylinder liner including the outer peripheral surface formed of a casting surface, with respect to the radial direction (thickness direction) of the cylindrical member, with the outer peripheral surface (casting surface) of the cylindrical member immediately after centrifugal casting using a cylindrical mold being a reference position (0 mm), (i) it is preferred that the continuous region be formed so as to include a range of from 0.8 mm to 1.2 mm, (ii) it is more preferred that the continuous region be formed so as to include a range of from 0.8 mm to 1.5 mm, (iii) it is still more preferred that the continuous region be formed so as to include a range of from 0.8 mm to 2.2 mm, and (iv) it is yet still more preferred that the continuous region be formed so as to include a range of from 0.8 mm to 3.5 mm. When protrusions having an average height of from about 0.1 mm to about 2 mm are formed on the outer peripheral surface (casting surface), the outer peripheral base surface on which protrusions are not formed is set to a reference position (0 mm).

When the inner peripheral surface (casting surface) of the cylindrical member is subjected to cutting processing or the like to form a new inner peripheral surface (sliding surface) that slides in contact with a piston and a piston ring mounted on a groove formed on an outer peripheral surface of the piston, in order to obtain a sliding surface excellent in abrasion resistance and seizing resistance, with respect to the radial direction (thickness direction) of the cylindrical member, it is preferred that the inner peripheral surface (sliding surface) be formed within a range of from 1.0 mm to 1.2 mm in the case shown in (i), it is preferred that the inner peripheral surface (sliding surface) be formed within a range of from 1.0 mm to 1.5 mm in the case shown in (ii), it is preferred that the inner peripheral surface (sliding surface) be formed within a range of from 1.0 mm to 2.2 mm in the case shown in (iii), and it is preferred that the inner peripheral surface (sliding surface) be formed within a range of from 1.0 mm to 3.5 mm in the case shown in (iv).

When the cylindrical member of this embodiment is used as a cylinder liner, and in addition, when the cylindrical member of this embodiment is used for various other applications, the area ratio of a carbide on the inner peripheral surface (sliding surface) or the outer peripheral surface (sliding surface) that is newly formed is preferably 2.1% or more and 5% or less from the viewpoint of further enhancing abrasion resistance, more preferably 3.3% or more and 5% or less from the viewpoint of further enhancing both abrasion resistance and seizing resistance.

Further, a cylindrical member made of flake graphite cast iron according to a second embodiment of the present invention is a cylindrical member made of flake graphite cast iron, the flake graphite cast iron including a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, more than 0% and 0.6% or less of another element except C, Si, Mn, P, S, Cr, Mo, Ni, and Fe (hereinafter referred to as "element X"), and the balance of Fe and inevitable impurities.

Flake graphite cast iron to be used in a cylindrical member made of flake graphite cast iron according to the second embodiment has the same composition and structure as those of the cylindrical member made of flake graphite cast iron according to the first embodiment except that the element X is further contained in an amount of more than 0% and 0.6% or less with respect to the composition of the flake graphite cast iron to be used in the cylindrical member made of flake graphite cast iron according to the first embodiment. The cylindrical member made of flake graphite cast iron according to the second embodiment also has practical processability as well as excellent mechanical strength and further is excellent in abrasion resistance and seizing resistance in the same manner as in the cylindrical member made of flake graphite cast iron according to the first embodiment.

The element X is an element to be added for the purpose of further improving and enhancing a particular characteristic of various characteristics of the flake graphite cast iron to be used in the cylindrical member made of flake graphite cast iron according to the first embodiment. It may be appropriately determined which element should be used as the element X in accordance with the particular characteristic to be improved and enhanced. It is necessary that the content of the element X be more than 0% in order to improve and enhance the particular characteristic. Meanwhile, when the content of the element X is too large, it becomes difficult to obtain mechanical strength, processability, abrasion resistance and seizing resistance equivalent to or more than those of the cylindrical member made of flake graphite cast iron according to the first embodiment. Therefore, the content of the element X needs to be 0.6% or less. The content of the element X is preferably 0.03% or more and 0.55% or less.

As the element X, only one kind of element may be used, or two or more kinds of elements may be used. When two or more kinds of elements are used as the element X, the content of each element may be appropriately selected within such a range that the total content of each element used as the element X is 0.03% or more and 0.6% or less. It is preferred that, as the element X, for example, Cu, B, Ti, V, Nb, and the like be used.

Cu is an element that is effective for stabilizing pearlite by being dissolved in solid in a base to strengthen the base. Further, Cu increases the hardness of cast iron, inhibits white iron formation, and enhances corrosion resistance and impact resistance. In order to attain such effects, it is preferred that the content of Cube 0.05% or more. Meanwhile, it is only necessary that the upper limit of the content of Cu be 0.6% or less, but in order to suppress an increase in material cost, the upper limit is preferably 0.55% or less from the practical viewpoint.

B is an element that causes a carbide to precipitate, to thereby enhance abrasion resistance and seizing resistance. In order to attain such effects, it is sufficient that the content of B be 0.03% or more and 0.15% or less. Ti serves to cause a carbide to precipitate and accelerate graphitization and to miniaturize graphite so that graphite is dispersed uniformly. In order to attain such effects, it is preferred that the content of Ti be 0.03% or more and 0.20% or less. V serves to suppress precipitation of graphite while causing a carbide to precipitate. Further, V serves to miniaturize graphite so that graphite is dispersed uniformly. In order to attain such effects, it is preferred that the content of V be preferably 0.05% or more and 0.40% or less. Nb serves to cause a carbide to precipitate. In order to attain such effects, it is preferred that the content of Nb be 0.05% or more and 0.50% or less.

The cylindrical member made of flake graphite cast iron of this embodiment may be appropriately manufactured through use of a known manufacturing method for a cast metal. For example, the cylindrical member made of flake graphite cast iron of this embodiment having a predetermined dimension and shape may be manufactured by melting a molten metal through use of an electric furnace or the like, followed by centrifugal casting using a cylindrical mold.

Figure 2A:
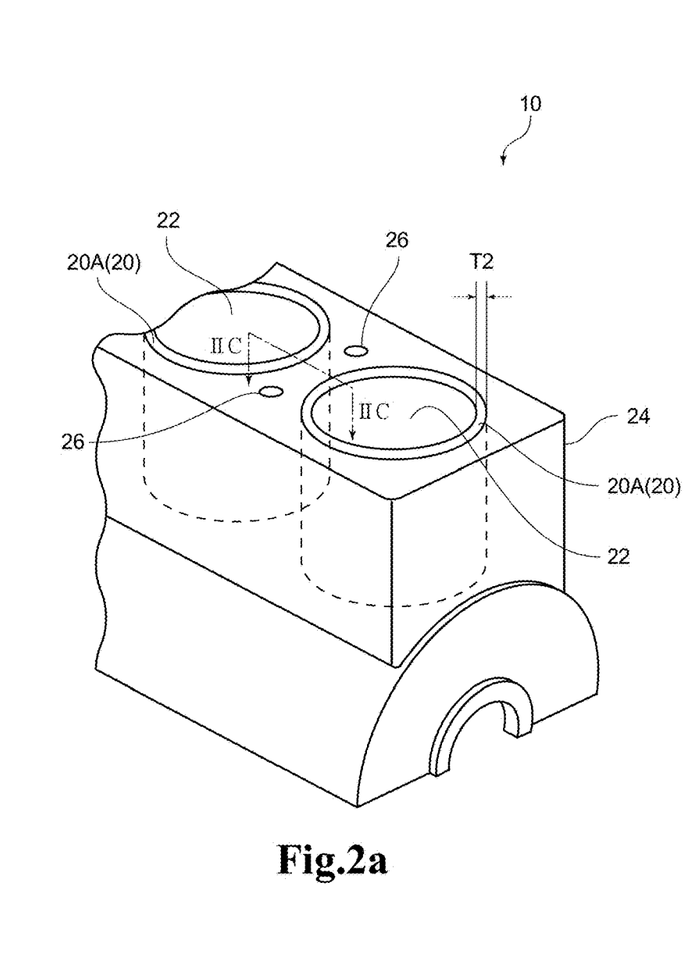
FIG. 2a is a perspective view for illustrating an example of an internal combustion engine including a cylinder liner formed of a cylindrical member made of flake graphite cast iron according to an embodiment of the present invention.

As described above, the cylindrical member made of flake graphite cast iron of this embodiment uses flake graphite cast iron having excellent mechanical characteristics. Therefore, it is also easy to reduce the thickness of the cylindrical member, to thereby reduce the weight thereof. Here, a thickness T2 of the cylindrical member may be appropriately selected depending on the application of the cylindrical member made of flake graphite cast iron of this embodiment, but is preferably 3.5 mm or less, more preferably 1.5 mm or less. The lower limit value of the thickness T2 is preferably 1.0 mm or more from the practical viewpoint. It is only necessary that the thickness T2 be attained at least in a state in which the cylindrical member made of flake graphite cast iron of this embodiment is used in a final product. For example, when the cylindrical member made of flake graphite cast iron of this embodiment is a cylinder liner 20 to be used in an internal combustion engine 10 as illustrated in FIG. 2a, it is only necessary that the above-mentioned thickness T2 be realized in a state of a completed internal combustion engine, such as the state in which a cylinder liner 20A (20) is inserted in a cylinder block 24 (state used in the final product).

Figure 2B:
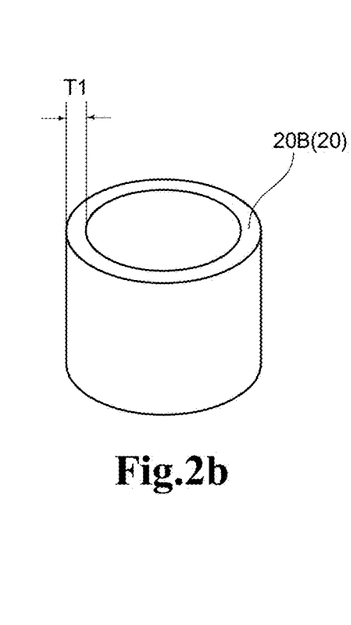
FIG. 2b is a perspective view for illustrating an example of the cylinder liner formed of the cylindrical member made of flake graphite cast iron according to the embodiment before being used for manufacturing an internal combustion engine.
Figure 2C:
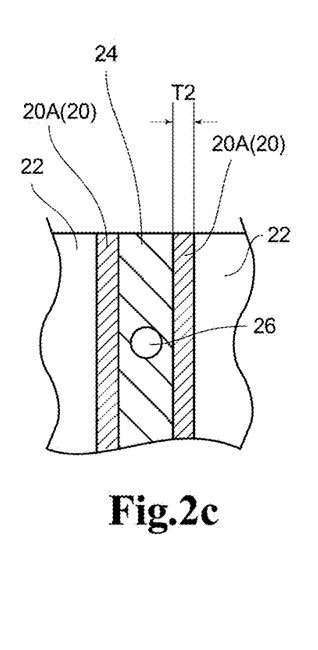

Further, in a state of a single cylinder liner 20B (20) before being inserted into the cylinder block 24 as illustrated in FIG. 2b, a thickness T1 is a value obtained by adding a processing allowance a to the thickness T2 so that a predetermined sectional structure, a minimum thickness, and the like of the final product can be ensured, and may be larger than, for example, 3.5 mm, further 5.5 mm or more. In this case, FIG. 2a is a perspective view for illustrating an external appearance of the internal combustion engine 10, and portions of the cylinder liner 20 illustrated in FIG. 2a, which are covered with the cylinder block 24 to be originally difficult to see from outside, are represented by dotted lines. A general dimension and shape of the cylinder liner 20 as illustrated in FIG. 2 has an outer diameter of about 50 mm or more and about 180 mm or less and a length of about 70 mm or more and about 270 mm or less.

There is no particular limitation on the hardness, tensile strength, and Young's modulus of the flake graphite cast iron to be used in the cylindrical member made of flake graphite cast iron of this embodiment, but the hardness is preferably 102 HRB or more and 112 HRB or less, the tensile strength is preferably 300 MPa or more, and the Young's modulus is preferably 110 GPa or more. It is more preferred that those three numerical value ranges be satisfied simultaneously.

The tensile strength is 330 MPa or more, more preferably 350 MPa or more, and the Young's modulus is preferably 120 GPa or more.

There is no particular limitation on the application of the cylindrical member made of flake graphite cast iron of this embodiment, but it is particularly preferred that the cylindrical member be used as a cylinder liner to be used in an internal combustion engine in which a piston and a piston ring reciprocate and slide on the inner peripheral surface.

The cylinder liner is used as a dry-type cylinder liner that is used in an internal combustion engine and is fitted with a cylinder block made of cast iron, a cylinder liner that is inserted into a cylinder block made of an aluminum alloy, or the like. A piston and a piston ring mounted on a groove formed on the outer peripheral surface of the piston slide on the inner peripheral surface of the cylinder liner. Therefore, the cylinder liner is required to have excellent abrasion resistance and seizing resistance. Further, in recent years, in order to reduce the weight of the cylinder block, in particular, for the purpose of improving fuel consumption of an automobile, a pitch between cylinder bores is becoming small. Therefore, there is a problem of a cooling method for decreasing the temperature of a cylinder bore inner wall surface during combustion. To cope with this, when the thickness T2 of the cylinder liner 20A in a state of being incorporated into the internal combustion engine 10 can be further reduced as illustrated in FIG. 2a, the flow path sectional area of a cooling liquid flow path 26 arranged between two adjacent cylinder bores 22 (more precisely, between outer peripheral surfaces of the two cylinder liners 20A) can be even more increased. In this case, the cooling efficiency of the cylinder bore 22 can be even more enhanced easily.

Meanwhile, the cylindrical member made of flake graphite cast iron of this embodiment is excellent in abrasion resistance and seizing resistance and also has excellent mechanical strength. Therefore, it is also significantly easy to reduce the thickness T2 of the cylinder liner 20A. Thus, the cylindrical member made of flake graphite cast iron of this embodiment can also satisfy the above-mentioned needs sufficiently.

Further, when the thickness T2 is reduced, it also becomes easy to largely reduce the weight and volume of the cylinder liner 20A. For example, it is assumed that the thickness T2 is 2.2 mm, the outer diameter is 85 mm, the inner diameter is 80.6 mm, and the length in the axial direction is 136 mm. When the thickness T2 is set to 1.5 mm, the volume is reduced by 31% from 77.8 cm$^3$ to 53.5 cm$^3$, and the weight is reduced by 176.2 g from 564.1 g to 387.9 g. In this case, the weight was calculated by setting the specific gravity of flake graphite cast iron to 7.25 g/cm$^3$.

Figure 3:
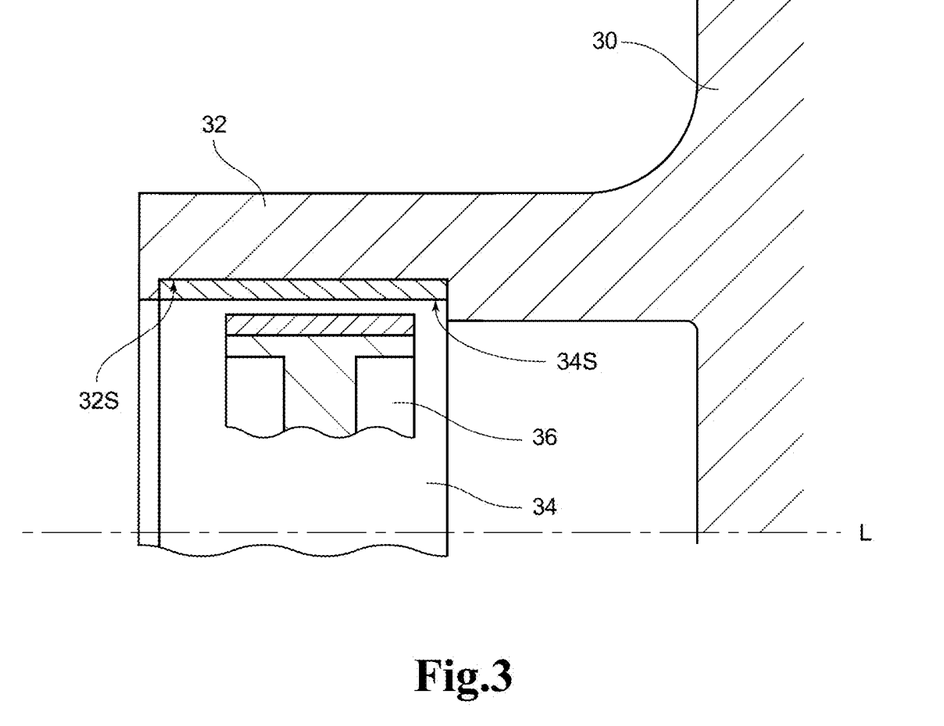
FIG. 3 is a schematic sectional view for illustrating an example of the case in which the cylindrical members made of flake graphite cast iron of the first and second inventions are used as a brake drum of an internally expanding drum brake.

It is also preferred that the cylindrical member made of flake graphite cast iron of this embodiment be used as a brake drum of an internally expanding drum brake that slides on a brake shoe on the inner peripheral surface. FIG. 3 is a schematic sectional view for illustrating an example of an internally expanding drum brake in which the cylindrical member made of flake graphite cast iron of this embodiment is used as a brake drum, in which a wheel is cut along a surface including a rotation axis of the wheel. As illustrated in FIG. 3, a brake drum 34 (cylindrical member made of flake graphite cast iron of this embodiment) is mounted so as to be inserted into an inner peripheral surface 32S of a substantially cylindrical drum portion 32 forming a part of a wheel 30 with a center line L being the rotation axis. A brake shoe 36 is arranged on an inner peripheral surface 34S side of the brake drum 34. At a time of braking, the brake shoe 36 slides in contact with the inner peripheral surface 34S of the brake drum 34.

The brake drum of the internally expanding drum brake is required to have abrasion resistance, seizing resistance, and a heat transfer property. To cope with this, the cylindrical member made of flake graphite cast iron of this embodiment is excellent in abrasion resistance and seizing resistance, and in addition, is excellent in mechanical strength. Therefore, the thickness of the brake drum 34 can also be reduced. The reduction in thickness of the brake drum 34 can also enhance the heat transfer property.

EXAMPLES

Now, the cylindrical member made of flake graphite cast iron of the present invention is described by way of Examples, but the present invention is not limited only to the following Examples.

1. Manufacturing of Cylindrical Member

A cylindrical member (outer diameter: 85 mm, inner diameter: 74 mm (thickness: 5.5 mm), length in axial direction: 136 mm) was manufactured by centrifugal casting. During the centrifugal casting, a mold wash material having a thickness of 1 mm was applied onto an inner peripheral surface of a cylindrical mold, and a molten metal was poured into the cylindrical mold, to thereby form a cylindrical member. The mold wash material adhering to an outer peripheral surface (casting surface) of the cylindrical member removed from the cylindrical mold was removed by shot blasting. The surface roughness of the outer peripheral surface of the cylindrical member thus obtained was 160 μm in terms of a maximum height Ry.

2. Preparation of Test Pieces for Various Evaluations

A total of four bar-like members (length a: 136 mm, width b: 15 mm, thickness c: 5.5 mm) were cut out from positions of 0°, 90°, 180°, and 270° with respect to the circumferential direction of the cylindrical member of each of Examples and Comparative Examples, and the cylindrical member was divided into four parts with respect to the circumferential direction, to thereby provide four circular arc columnar members. The length a, width b, and thickness c of the member cut out from the cylindrical member or the test piece correspond to lengths of the cylindrical member in the axial direction, the circumferential direction, and the radial direction (thickness direction), respectively.

Next, a first test piece (length a: 25 mm, width b: 15 mm, thickness c: 5.5 mm) was cut out from a center portion of each bar-like member in the longitudinal direction. Further, two members (length a: 40 mm, width b: 15 mm, thickness c: 5.5 mm) were cut out from both sides of the center portion of the bar-like member in the longitudinal direction, and one set of those two members was defined as a second test piece for composition analysis. With this, four first test pieces and four sets of second test pieces were prepared from one cylindrical member.

Further, a third test piece for a tensile strength test (outline shape: length a: 120 mm, outer diameter: 4 mm), a fourth test piece for a Young's modulus test (outline shape: length a: 120 mm, outer diameter: 4 mm), a fifth test piece for a seizing resistance test (length a: 70 mm, width b: 10 mm, thickness c: 5.5 mm), and a sixth test piece for an abrasion resistance test (length a: 70 mm, width b: 10 mm, thickness c: 5.5 mm) were cut out from each circular arc columnar member. With this, four each of third test pieces to sixth test pieces were prepared from one cylindrical member. The detailed shapes of the third test piece and the fourth test piece are described later.

3. Various Evaluations of Cylindrical Member

The cylindrical member of each of Examples and Comparative Examples shown in Table 1 was evaluated for composition, graphite area ratio, carbide area ratio, base structure, hardness, tensile strength, Young's modulus, seizing resistance, abrasion resistance, and processability. The results are shown in Tables 1 to 5. The flake graphite cast iron used in the cylindrical member of Comparative Example 1 shown in Tables 1 to 5 is the same as a constituent material of a commercially available cylinder liner used in an internal combustion engine of an automobile. Further, the details of evaluation methods for various evaluation items in Tables 1 to 5 are as follows.

(1) Composition

The results obtained by analyzing the composition of each obtained cylindrical member by photoelectric emission spectrochemical analysis (PDA-7020 manufactured by Shimadzu Corporation) in accordance with JIS 2611-1977 are shown in Table 1. The composition analysis was performed through use of a measurement sample having a predetermined shape obtained by completely dissolving the second test piece. Further, the results shown in Table 1 are values obtained by averaging respective measurement values of four second test pieces.

(2) Graphite Area Ratio

A cut cross-section (length a: 25 mm, thickness c: 5.5 mm) of the first test piece of each of Examples and Comparative Examples was polished. Then, the polished surface was photographed with a metallurgical microscope (magnification: 400 times) at positions of 0.8 mm, 1.5 mm, 2.2 mm, and 3.5 mm from the outer peripheral surface side of the cylindrical member. Next, the obtained photograph was subjected to image analysis by binarization processing (gray scale processing), to thereby determine a graphite area ratio (%). The results are shown in Table 2. The graphite area ratio (%) shown in Table 2 is a value obtained by averaging measurement values of four first test pieces.

Figure 4:
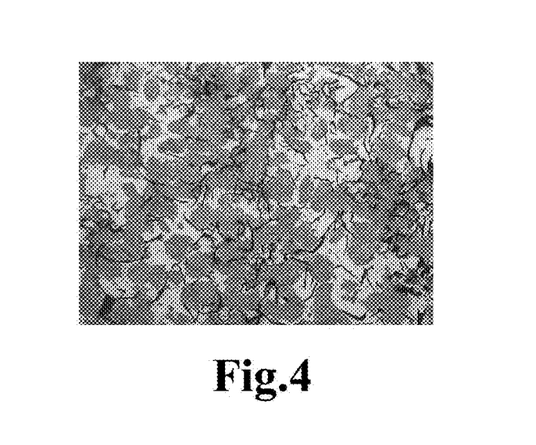
FIG. 4 is an example of a metallograph (magnification: 400 times) of Example 11.

For reference, a metallograph (magnification: 400 times) of Example 11 is shown in FIG. 4. As shown in FIG. 4, flake graphite (black flake portion in the figure) was observed. Similar flake graphite was also observed in all the other Examples and Comparative Examples.

(3) Carbide Area Ratio

The polished surface (length a: 25 mm, thickness c: 5.5 mm) of the first test piece used for measuring a graphite area ratio was polished again and subjected to etching treatment with a corrosion solution (10% nital solution). Then, the surface subjected to etching treatment was photographed with a metallurgical microscope (magnification: 400 times) at positions of 0.8 mm, 1.5 mm, 2.2 mm, and 3.5 mm from the outer peripheral surface side of the cylindrical member. Next, the obtained photographs were subjected to image analysis by binarization processing (gray scale processing), to thereby determine a carbide area ratio (%). The results are shown in Table 2. The carbide area ratio (%) shown in Table 2 is a value obtained by averaging measurement values of four first test pieces.

Figure 5:
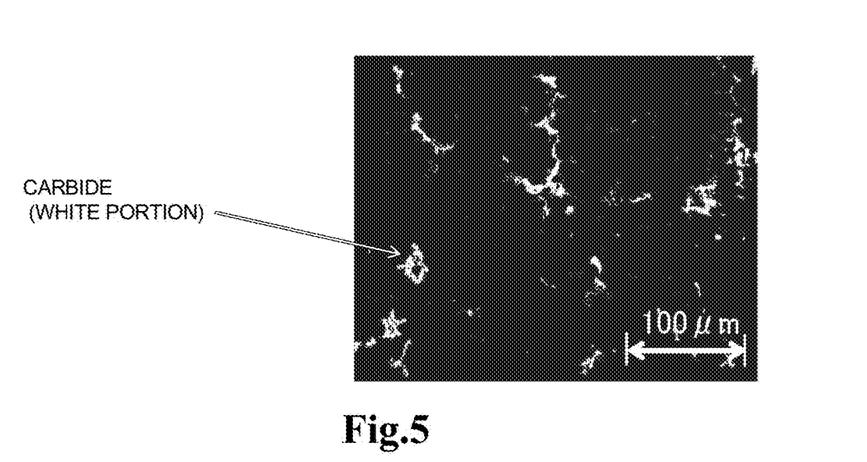
FIG. 5 is an example of an image (magnification: 400 times) after gray-scale processing used for determining a carbide area ratio of Example 11.

For reference, an image (magnification: 400 times) after gray scale processing used for determining a carbide area ratio of Example 11 is shown in FIG. 5. As shown in FIG. 5, a white portion corresponds to a carbide. A similar carbide was also observed in all the other Examples and Comparative Examples.

(4) Base Structure

The etched surface (length a: 25 mm, thickness c: 5.5 mm) of the first test piece used for measuring a carbide area ratio was polished again and subjected to etching treatment with a corrosion solution (3% picral solution). Then, it was visually determined with a metallurgical microscope which of pearlite and bainite was contained at positions of 0.8 mm, 1.5 mm, 2.2 mm, and 3.5 mm from the outer peripheral surface side of the cylindrical member. The results are shown in Table 2. In Table 2, "P" means that pearlite was observed, "B" means that bainite was observed, and "P+B" means that both pearlite and bainite were observed.

As shown in the metallograph of FIG. 4, bainite was observed as a white portion, and pearlite was observed as a gray portion during observation with a metallurgical microscope.

(5) Hardness

A cut cross-section (length a: 25 mm, thickness c: 5.5 mm) of the first test piece was measured for hardness at a position of 2.0 mm from the outer peripheral surface side of the cylindrical member. In this case, a measurement method for hardness was performed in accordance with JIS Z 2245. The results are shown in Table 3. The hardness shown in Table 3 is a value obtained by averaging measurement values of four first test pieces.

(6) Tensile Strength and Young's Modulus

Figure 6:
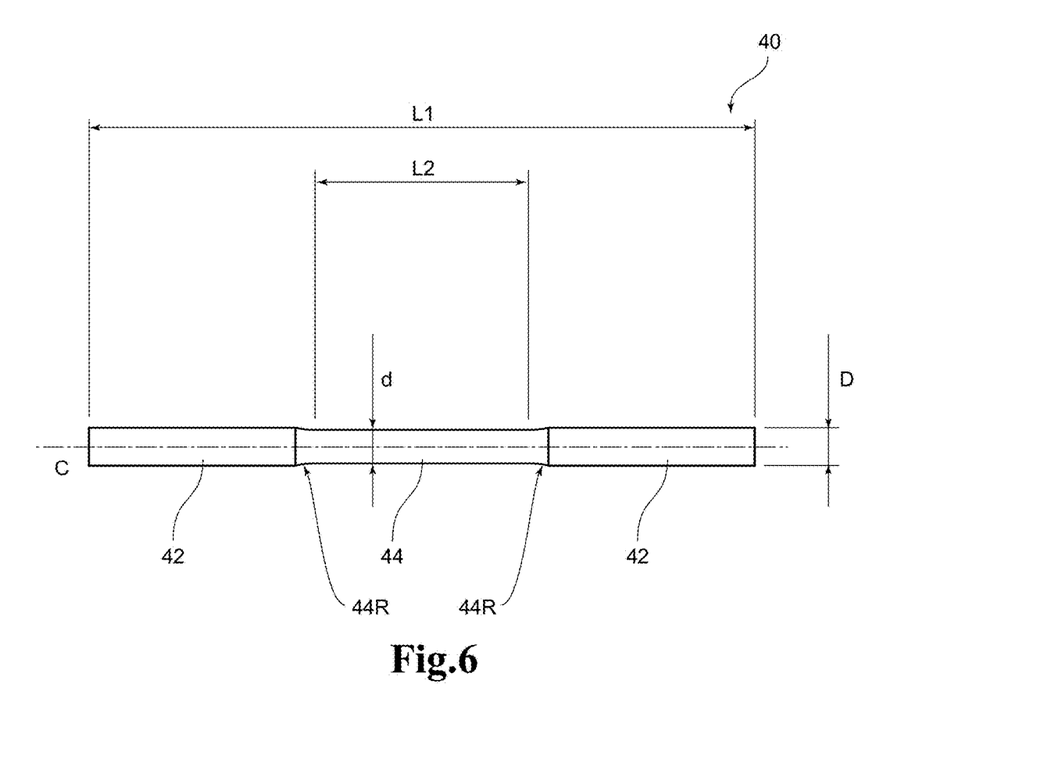
FIG. 6 is a side view of a bar-like test piece used for measuring a tensile strength and a Young's modulus.

As the third test piece and the fourth test piece used for measuring a tensile strength and a Young's modulus, a bar-like test piece 40 illustrated in FIG. 6 was used. The bar-like test piece 40 is a columnar portion having a length L1 of 120 mm, in which a diameter D of portions 42 on both end sides in an axial direction C is 4 mm, and a diameter d of a center portion 44 in the axial direction C is 3 mm. The surface of the center portion 44 is subjected to fine finishing, and a length L2 of the center portion 44 excluding chamfered portions 44R obtained by chamfering both end portions of the center portion 44 by R15 is 40 mm. The tensile strength and Young's modulus were each measured in accordance with JIS Z 2241 and JIS Z 2280. Specifically, the bar-like test piece 40 was set on a tensile testing machine (Model AG-5000E manufactured by Shimadzu Corporation) and measured at a tension speed of 0.3 mm/min. The results are shown in Table 3. Each tensile strength and each Young's modulus shown in Table 3 are values respectively obtained by averaging measurement values of four test pieces.

In this test, the cylindrical member having a length in the axial direction of 136 mm was used. However, when a cylindrical member having a length in the axial direction of 120 mm or less is used, a tensile strength and a Young's modulus are evaluated through use of the bar-like test piece 40 having a length L1 of 50 mm and a length L2 of 20 mm.

(7) Seizing Resistance

Figure 7:
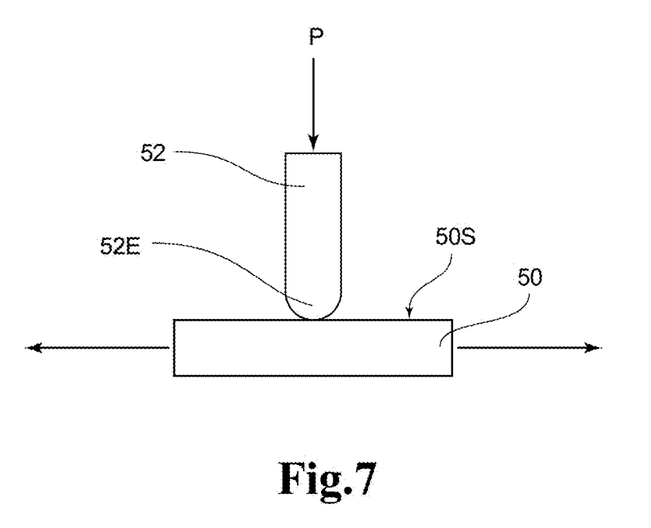
FIG. 7 is a schematic view of a ring-on-plate type reciprocating dynamic friction tester used for evaluating seizing resistance and abrasion resistance.

The seizing resistance was evaluated through use of a ring-on-plate type reciprocating dynamic friction tester illustrated in FIG. 7. One lower test piece 50 was collected from one fifth test piece. In this case, each lower test piece 50 was subjected to a test, first at a position of 3.5 mm and then at a position of 2.2 mm from the outer peripheral surface side of the cylindrical member.

The seizing resistance was evaluated by the following procedure. First, spindle oil was applied onto a surface 50S of the lower test piece 50 having a plate shape, and then, a hemispherical tip end portion 52E of an upper test piece 52 having a pin shape was pressed against the surface 50S under a load P with a spring. In this state, the lower test piece 50 was caused to reciprocate in a direction orthogonal to the application direction of the load P. Then, the load P was increased by a predetermined value every time a predetermined time period elapses while the hemispherical tip end portion 52E of the upper test piece 52 and the surface 50S of the lower test piece 50 slid on each other, and the load P (seizing load) at which seizing (scuff) occurred on the surface 50S of the lower test piece 50 was measured.

Test conditions are as follows.

(a) Upper Test Piece 52

Material: JIS SUS420J2 material

Coating of surface (sliding surface) of hemispherical tip end portion 52E: hard chromium plating Finishing after coating of surface (sliding surface) of hemispherical tip end portion 52E: mirror finishing Increase speed of load P: 20 N for one minute after the start, increase by 20 N for every elapse of one minute (b) Lower Test Piece 50

Sample: member having a plate shape obtained by subjecting surfaces corresponding to the outer peripheral surface and the inner peripheral surface of the cylindrical member to cutting processing and mirror finishing in the fifth test piece (length a: 70 mm, width b: 10 mm, thickness c: 5.5 mm)

Finishing of surface 50S (sliding surface): mirror finishing (the first test was performed by forming the surface 50S (sliding surface) at a position of 3.5 mm from the outer peripheral surface, and then, the second test was performed by performing processing again to form the surface 50S (sliding surface) at a position of 2.2 mm from the outer peripheral surface.)

Movement speed: 100 reciprocations per minute

Movement distance for one reciprocation: 100 mm

The results are shown in Table 4. The seizing load used for calculating the "seizing load ratio" shown in Table 4 is a value obtained by averaging measurement values of four test pieces at the same position of the cylindrical member in the radial direction. The "seizing load ratio" shown in Table 4 is a relative value of the seizing load when the seizing load of Comparative Example 1 is defined as a reference value (100). Further, the evaluation criteria of the "Seizing resistance evaluation" shown in Table 4 areas follows.

—Evaluation Criteria of "Seizing Resistance Evaluation"—

A: A seizing load ratio is 150 or more.

B: A seizing load ratio is 120 or more and less than 150.

C: A seizing load ratio is 100 or more and less than 120.

(8) Abrasion Resistance

The abrasion resistance was evaluated through use of the ring-on-plate type reciprocating dynamic friction tester illustrated in FIG. 7. One lower test piece 50 was collected from one fifth test piece. In this case, each lower test piece 50 was subjected to a test, first at a position of 3.5 mm and then at a position of 2.2 mm from the outer peripheral surface side of the cylindrical member. Here, the abrasion resistance was evaluated by the following procedure. First, the hemispherical tip end portion 52E of the upper test piece 52 having a pin shape was pressed against the surface 50S of the lower test piece 50 having a plate shape under a load P with a spring. In this state, the lower test piece 50 was caused to reciprocate in a direction orthogonal to the application direction of the load P. Further, during the test, spindle oil was dropped continuously between the surface 50S of the lower test piece 50 and the hemispherical tip end portion 52E of the upper test piece 52 through use of a tubing pump or an air dispenser. Then, after an elapse of a predetermined time period, the reciprocating movement was stopped, and the abrasion depth of the surface 50S of the lower test piece 50 was measured with a surface roughness meter.

Test conditions are as follows.

(a) Upper Test Piece 52

Material: JIS SUS420J2 material

Coating of surface (sliding surface) of hemispherical tip end portion 52E: CrN film (film formed by a physical vapor deposition (PVD) method)

Finishing after coating of surface (sliding surface) of hemispherical tip end portion 52E: mirror finishing Load P: 100 N (b) Lower Test Piece 50

Sample: member having a plate shape obtained by subjecting surfaces corresponding to the outer peripheral surface and the inner peripheral surface of the cylindrical member to cutting processing and mirror finishing in the sixth test piece (length a: 70 mm, width b: 10 mm, thickness c: 5.5 mm)

Finishing of surface 50S (sliding surface): mirror finishing (the first test was performed by forming the surface 50S (sliding surface) at a position of 3.5 mm from the outer peripheral surface, and then, the second test was performed by performing processing again to form the surface 50S (sliding surface) at a position of 2.2 mm from the outer peripheral surface.)

Movement speed: 600 reciprocations per minute

Movement distance for one reciprocation: 100 mm (c) Test Time: 60 minutes

The results are shown in Table 4. The abrasion depth used for calculating the "abrasion amount ratio" shown in Table 4 is a value obtained by averaging measurement values of four test pieces at the same position of the cylindrical member in the radial direction. The "abrasion amount ratio" shown in Table 4 is a relative value of an abrasion amount when the abrasion amount of Comparative Example 1 is defined as a reference value (100). Further, the evaluation criteria of the "Abrasion resistance evaluation" shown in Table 4 are as follows.

—Evaluation Criteria of "Abrasion Resistance Evaluation"—

A: An abrasion amount ratio is 10 or less.

B: An abrasion amount ratio is more than 10 and 50 or less.

C: An abrasion amount ratio is more than 50 and 100 or less.

(9) Processability

The processability was evaluated by the following procedure. In the evaluation, four cylindrical members were used in each of Examples and Comparative Examples, and the following cutting test was performed four times. First, the inner peripheral surface (casting surface) of the cylindrical member of each of Examples and Comparative Examples was roughly processed to have a thickness of 2.2 mm through use of a machining center including a cutting tool that rotates, to thereby completely remove blow holes. Next, the roughly processed inner peripheral surface was subjected to cutting to have a thickness of 1.4 mm through use a new cutting tool (material type: CBN, throw-away chip, nose radius R: 0.8 mm), and a maximum abrasion width in a flank face of the cutting tool after the completion of cutting was measured. The cutting conditions in this case were set to a cutting length of 136 mm, a depth of cut of 0.05 mm, a cutting feed of 0.35 mm/rev, and a cutting tool rotation speed of 3,000 rpm, and a cutting solution was sufficiently supplied.

The results are shown in Table 5. The maximum abrasion width used for calculating the "Cutting tool abrasion ratio" shown in Table 5 is a value obtained by averaging measurement values of the four cutting tests. In Table 5, the "cutting tool abrasion ratio" is a relative value of a maximum abrasion width when the maximum abrasion width of Comparative Example 4 is defined as a reference value (100). The evaluation criteria of the "Processability evaluation" in Table 5 are as follows.

—Evaluation Criteria of "Processability Evaluation"—

A: A cutting tool abrasion ratio is less than 80.

B: A cutting tool abrasion ratio is 80 or more and less than 90.

C: A cutting tool abrasion ratio is 90 or more and 100 or less.

TABLE 1

| | Composition of flake graphite cast iron | | | | | | | | | | |
|---|---|---|---|---|---|---|---|---|---|---|---|
| | C mass % | Si mass % | Mn mass % | P mass % | S mass % | Cr mass % | Mo mass % | Ni mass % | Cu mass % | Fe mass % | Mo + Ni mass % |
| Example 1 | 2.90 | 2.01 | 0.64 | 0.10 | 0.03 | 0.20 | 0.15 | 0.20 | | Balance | 0.35 |
| Example 2 | 2.90 | 2.01 | 0.64 | 0.14 | 0.10 | 0.26 | 0.20 | 0.15 | | Balance | 0.35 |
| Example 3 | 2.89 | 1.99 | 0.64 | 0.06 | 0.13 | 0.15 | 0.20 | 0.18 | | Balance | 0.38 |
| Example 4 | 3.31 | 2.51 | 0.65 | 0.11 | 0.04 | 0.28 | 0.19 | 0.19 | | Balance | 0.38 |
| Example 5 | 2.89 | 2.51 | 0.65 | 0.12 | 0.04 | 0.43 | 0.19 | 0.19 | 0.08 | Balance | 0.38 |
| Example 6 | 2.89 | 2.51 | 0.65 | 0.03 | 0.12 | 0.18 | 0.20 | 0.19 | 0.50 | Balance | 0.39 |
| Example 7 | 2.89 | 1.99 | 0.64 | 0.05 | 0.03 | 0.19 | 0.19 | 0.61 | | Balance | 0.80 |
| Example 8 | 3.31 | 2.51 | 0.65 | 0.12 | 0.10 | 0.18 | 0.18 | 0.62 | | Balance | 0.80 |
| Example 9 | 2.88 | 1.96 | 0.78 | 0.25 | 0.14 | 0.54 | 0.25 | 0.25 | | Balance | 0.50 |
| Example 10 | 3.32 | 2.53 | 0.45 | 0.20 | 0.15 | 0.46 | 0.35 | 0.34 | | Balance | 0.69 |
| Example 11 | 2.89 | 2.00 | 0.65 | 0.05 | 0.05 | 0.24 | 0.39 | 0.40 | | Balance | 0.79 |
| Example 12 | 3.11 | 2.25 | 0.65 | 0.08 | 0.05 | 0.32 | 0.40 | 0.41 | | Balance | 0.81 |
| Example 13 | 3.09 | 2.25 | 0.65 | 0.09 | 0.05 | 0.35 | 0.41 | 0.40 | 0.25 | Balance | 0.81 |
| Example 14 | 3.31 | 2.51 | 0.65 | 0.12 | 0.05 | 0.40 | 0.40 | 0.40 | | Balance | 0.80 |
| Example 15 | 2.87 | 1.95 | 0.46 | 0.25 | 0.14 | 0.48 | 0.50 | 0.56 | | Balance | 1.06 |
| Example 16 | 3.34 | 2.55 | 0.80 | 0.24 | 0.15 | 0.55 | 0.55 | 0.60 | | Balance | 1.15 |
| Example 17 | 2.89 | 1.99 | 0.64 | 0.05 | 0.12 | 0.51 | 0.61 | 0.18 | | Balance | 0.79 |
| Example 18 | 3.31 | 2.51 | 0.65 | 0.13 | 0.11 | 0.51 | 0.60 | 0.19 | | Balance | 0.79 |
| Example 19 | 2.89 | 1.99 | 0.64 | 0.05 | 0.12 | 0.18 | 0.62 | 0.61 | | Balance | 1.23 |
| Example 20 | 3.31 | 2.51 | 0.65 | 0.13 | 0.11 | 0.42 | 0.61 | 0.60 | | Balance | 1.21 |
| Example 21 | 3.31 | 2.51 | 0.49 | 0.05 | 0.12 | 0.51 | 0.60 | 0.61 | 0.51 | Balance | 1.21 |
| Comparative Example 1 | 3.46 | 2.37 | 0.71 | 0.13 | 0.03 | 0.12 | | | | Balance | 0.00 |
| Comparative Example 2 | 3.46 | 2.37 | 0.71 | 0.13 | 0.03 | 0.12 | 0.10 | | | Balance | 0.10 |
| Comparative Example 3 | 2.90 | 2.01 | 0.64 | 0.08 | 0.08 | 0.49 | 0.69 | 0.21 | | Balance | 0.90 |
| Comparative Example 4 | 3.32 | 2.48 | 0.80 | 0.24 | 0.12 | 0.52 | 0.79 | 0.60 | | Balance | 1.39 |

TABLE 2

| | Distance from outer peripheral surface 0.8 mm | | | Distance from outer peripheral surface 1.5 mm | | | Distance from outer peripheral surface 2.2 mm | | | Distance from outer peripheral surface 3.5 mm | | | Length of continuous region in radial direction mm |
|---|---|---|---|---|---|---|---|---|---|---|---|---|---|
| | Base structure | Carbide area ratio % | Graphite area ratio % | Base structure | Carbide area ratio % | Graphite area ratio % | Base structure | Carbide area ratio % | Graphite area ratio % | Base structure | Carbide area ratio % | Graphite area ratio % | |
| Example 1 | P | 0.9 | 12.0 | P | 1.1 | 12.1 | P | 1.3 | 12.1 | P | 1.6 | 12.2 | 2.7 or more |
| Example 2 | P | 1.2 | 12.0 | P | 1.5 | 12.0 | P | 1.9 | 12.1 | P | 2.1 | 12.2 | 2.7 or more |
| Example 3 | P | 1.3 | 12.0 | P | 1.5 | 12.0 | P | 1.8 | 12.1 | P | 2.1 | 12.2 | 2.7 or more |
| Example 4 | P | 1.3 | 12.2 | P | 1.5 | 12.2 | P | 1.8 | 12.3 | P | 2.1 | 12.4 | 2.7 or more |
| Example 5 | P | 1.2 | 12.2 | P | 1.5 | 12.2 | P | 1.8 | 12.3 | P | 2.1 | 12.4 | 2.7 or more |
| Example 6 | P | 1.2 | 12.2 | P | 1.5 | 12.2 | P | 1.8 | 12.4 | P | 2.1 | 12.5 | 2.7 or more |
| Example 7 | P | 1.2 | 12.9 | P | 1.4 | 12.9 | P | 1.6 | 13.0 | P | 2.0 | 13.0 | 2.7 or more |
| Example 8 | P | 1.2 | 14.1 | P | 1.4 | 14.1 | P | 1.7 | 14.1 | P | 2.0 | 14.2 | 2.7 or more |
| Example 9 | P | 2.2 | 12.3 | P | 2.7 | 12.3 | P | 2.9 | 12.4 | P | 3.3 | 12.5 | 2.7 or more |
| Example 10 | P + B | 2.5 | 12.5 | P + B | 2.8 | 12.5 | P + B | 3.3 | 12.6 | P + B | 3.5 | 12.7 | 2.7 or more |
| Example 11 | P + B | 2.1 | 11.0 | P + B | 2.4 | 11.0 | P + B | 2.9 | 11.0 | P + B | 3.5 | 11.2 | 2.7 or more |
| Example 12 | P + B | 2.1 | 11.5 | P + B | 2.5 | 11.5 | P + B | 2.9 | 11.5 | P + B | 3.5 | 11.7 | 2.7 or more |
| Example 13 | P + B | 2.1 | 11.5 | P + B | 2.5 | 11.5 | P + B | 3.0 | 11.5 | P + B | 3.5 | 11.6 | 2.7 or more |
| Example 14 | P + B | 2.0 | 11.9 | P + B | 2.5 | 11.9 | P + B | 2.9 | 11.9 | P + B | 3.5 | 12.1 | 2.7 or more |
| Example 15 | P + B | 3.1 | 9.5 | P + B | 3.6 | 9.6 | P + B | 4.3 | 9.7 | P + B | 4.8 | 9.7 | 2.7 or more |
| Example 16 | P + B | 3.3 | 10.2 | P + B | 3.7 | 10.2 | P + B | 4.5 | 10.3 | P + B | 4.9 | 10.4 | 2.7 or more |
| Example 17 | B | 3.1 | 8.0 | B | 3.5 | 8.1 | B | 4.2 | 8.2 | B | 5.0 | 8.3 | 2.7 or more |
| Example 18 | B | 3.0 | 8.1 | B | 3.5 | 8.1 | B | 4.2 | 8.2 | B | 5.0 | 8.4 | 2.7 or more |
| Example 19 | P + B | 3.0 | 8.2 | P + B | 3.4 | 8.2 | P + B | 4.1 | 8.3 | P + B | 4.9 | 8.5 | 2.7 or more |
| Example 20 | P + B | 3.0 | 9.1 | P + B | 3.3 | 9.1 | P + B | 4.0 | 9.1 | P + B | 4.9 | 9.3 | 2.7 or more |
| Example 21 | P + B | 2.9 | 9.1 | P + B | 3.3 | 9.1 | P + B | 4.1 | 9.2 | P + B | 4.8 | 9.3 | 2.7 or more |
| Comparative | P | 0.4 | 15.2 | P | 0.4 | 15.3 | P | 0.4 | 15.4 | P | 0.4 | 15.5 | 0.0 |

TABLE 2-continued

| | Distance from outer peripheral surface 0.8 mm | | | Distance from outer peripheral surface 1.5 mm | | | Distance from outer peripheral surface 2.2 mm | | | Distance from outer peripheral surface 3.5 mm | | | Length of continuous region in radial direction mm |
|---|---|---|---|---|---|---|---|---|---|---|---|---|---|
| | Base structure | Carbide area ratio % | Graphite area ratio % | Base structure | Carbide area ratio % | Graphite area ratio % | Base structure | Carbide area ratio % | Graphite area ratio % | Base structure | Carbide area ratio % | Graphite area ratio % | |
| Example 1 | | | | | | | | | | | | | |
| Comparative Example 2 | P | 0.6 | 14.5 | P | 0.8 | 14.5 | P | 1.0 | 14.5 | P | 1.3 | 14.6 | 1.3 or more |
| Comparative Example 3 | B | 3.5 | 7.8 | B | 4.0 | 7.8 | B | 4.8 | 7.9 | B | 5.6 | 8.0 | 1.4 or more |
| Comparative Example 4 | P + B | 3.7 | 7.3 | P + B | 4.2 | 7.3 | P + B | 5.1 | 7.4 | P + B | 5.9 | 7.5 | 0.7 or more |

Note:
In the base structure, P represents pearlite, B represents bainite, and P + B represent a mixed structure of pearlite and bainite.

TABLE 3

| | Hardness HRB | Tensile strength MPa | Young's modulus GPa |
|---|---|---|---|
| Example 1 | 101.8 | 335 | 120 |
| Example 2 | 102.8 | 342 | 107 |
| Example 3 | 103.0 | 355 | 118 |
| Example 4 | 102.5 | 339 | 117 |
| Example 5 | 102.8 | 342 | 117 |
| Example 6 | 103.1 | 344 | 119 |
| Example 7 | 101.9 | 334 | 138 |
| Example 8 | 101.6 | 321 | 135 |
| Example 9 | 103.8 | 348 | 120 |
| Example 10 | 105.6 | 372 | 124 |
| Example 11 | 106.7 | 394 | 128 |
| Example 12 | 106.4 | 390 | 126 |
| Example 13 | 108.3 | 392 | 128 |
| Example 14 | 106.6 | 385 | 126 |
| Example 15 | 108.8 | 413 | 126 |
| Example 16 | 109.8 | 426 | 128 |
| Example 17 | 112.0 | 481 | 113 |
| Example 18 | 111.8 | 472 | 112 |
| Example 19 | 109.5 | 419 | 124 |
| Example 20 | 109.4 | 418 | 124 |
| Example 21 | 110.0 | 417 | 125 |
| Comparative Example 1 | 98.5 | 285 | 95 |
| Comparative Example 2 | 100.6 | 321 | 96 |
| Comparative Example 3 | 113.8 | 512 | 111 |
| Comparative Example 4 | 114.0 | 470 | 120 |

TABLE 4

| | Seizing resistance (*1) | | Seizing resistance (*2) | | Abrasion resistance (*1) | | Abrasion resistance (*2) | |
|---|---|---|---|---|---|---|---|---|
| | Seizing load ratio | Seizing resistance evaluation | Seizing load ratio | Seizing resistance evaluation | Abrasion amount ratio | Abrasion resistance evaluation | Abrasion amount ratio | Abrasion resistance evaluation |
| Example 1 | 133 | B | 133 | B | 17 | B | 44 | B |
| Example 2 | 150 | B | 142 | B | 0 | A | 17 | B |
| Example 3 | 158 | B | 142 | B | 0 | A | 17 | B |
| Example 4 | 150 | B | 142 | B | 0 | A | 17 | B |
| Example 5 | 150 | B | 142 | B | 0 | A | 17 | B |
| Example 6 | 158 | B | 142 | B | 0 | A | 17 | B |
| Example 7 | 150 | B | 142 | B | 0 | A | 17 | B |
| Example 8 | 150 | B | 142 | B | 0 | A | 17 | B |
| Example 9 | 167 | A | 158 | B | 0 | A | 0 | A |
| Example 10 | 175 or more | A | 167 | A | 0 | A | 0 | A |
| Example 11 | 175 or more | A | 167 | A | 0 | A | 0 | A |
| Example 12 | 175 or more | A | 175 or more | A | 0 | A | 0 | A |
| Example 13 | 175 or more | A | 175 or more | A | 0 | A | 0 | A |
| Example 14 | 175 or more | A | 175 or more | A | 0 | A | 0 | A |
| Example 15 | 175 or more | A | 175 or more | A | 0 | A | 0 | A |
| Example 16 | 175 or more | A | 175 or more | A | 0 | A | 0 | A |
| Example 17 | 175 or more | A | 175 or more | A | 0 | A | 0 | A |
| Example 18 | 175 or more | A | 175 or more | A | 0 | A | 0 | A |
| Example 19 | 175 or more | A | 175 or more | A | 0 | A | 0 | A |
| Example 20 | 175 or more | A | 175 or more | A | 0 | A | 0 | A |
| Example 21 | 175 or more | A | 175 or more | A | 0 | A | 0 | A |
| Comparative Example 1 | 100 | C | 100 | C | 100 | C | 100 | C |
| Comparative Example 2 | 133 | B | 117 | B | 44 | B | 72 | C |
| Comparative Example 3 | 175 or more | A | 175 or more | A | 0 | A | 0 | A |
| Comparative Example 4 | 175 or more | A | 175 or more | A | 0 | A | 0 | A |

Note:
In *1, a test was performed through use of a lower test piece subjected to mirror finishing with a distance of 3.5 mm from an outer peripheral surface serving as a sliding surface, and in *2, a test was performed through use of a lower test piece subjected to mirror finishing with a distance of 2.2 mm from an outer peripheral surface serving as a sliding surface.

TABLE 5

| | Processability | |
|---|---|---|
| | Cutting tool abrasion ratio | Processability evaluation |
| Example 1 | 59 | A |
| Example 2 | 60 | A |
| Example 3 | 62 | A |
| Example 4 | 60 | A |
| Example 5 | 61 | A |
| Example 6 | 62 | A |
| Example 7 | 63 | A |
| Example 8 | 61 | A |
| Example 9 | 64 | A |
| Example 10 | 70 | A |
| Example 11 | 74 | A |
| Example 12 | 74 | A |
| Example 13 | 74 | A |
| Example 14 | 72 | A |
| Example 15 | 78 | A |
| Example 16 | 82 | B |
| Example 17 | 84 | B |
| Example 18 | 82 | B |
| Example 19 | 85 | B |
| Example 20 | 84 | B |
| Example 21 | 85 | B |
| Comparative Example 1 | 57 | A |
| Comparative Example 2 | 58 | A |
| Comparative Example 3 | 92 | C |
| Comparative Example 4 | 100 | C |

When the cylindrical members of Examples 1 to 21 are used as a cylinder liner having an outer peripheral surface formed of a casting surface, a new inner peripheral surface (sliding surface that slides in contact with a piston and a piston ring mounted on a groove formed on an outer peripheral surface of the piston) can be formed at a distance within a range of from 1.0 mm to 2.0 mm from the outer peripheral surface (casting surface), for example, by subjecting only an inner peripheral surface (casting surface) of the cylindrical member after centrifugal casting to cutting processing and the like. When the inner peripheral surface (surface) is subjected to cutting processing, a machining allowance by cutting is set to 2 mm for the purpose of completely removing blow holes. After that, cutting processing and the like are further performed, with the result that the inner peripheral surface (sliding surface) can be formed at the distance within the above-mentioned range from the outer peripheral surface (casting surface). In this case, the area ratio of a carbide in the new inner peripheral surface (sliding surface) falls within a range of 0.9% or more and 0.5% or less in any Example.

REFERENCE SIGNS LIST

10: internal combustion engine
20, 20A, 20B: cylinder liner (cylindrical member made of flake graphite cast iron material)
22: cylinder bore
24: cylinder block
26: cooling liquid flow path
30: wheel
32: drum portion
32S: inner peripheral surface
34: brake drum (cylindrical member made of flake graphite cast iron material)
34S: inner peripheral surface
36: brake shoe
40: bar-like test piece
42: both end side portion
44: center portion
44R: chamfered portion
50: lower test piece
50S: surface
52: upper test piece
52E: hemispherical tip end portion

The invention claimed is:

1. A cylindrical member made of flake graphite cast iron, the flake graphite cast iron comprising a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, and the balance of Fe and inevitable impurities,
wherein the cylindrical member has a thickness of 3.5 mm or less.

2. The cylindrical member made of flake graphite cast iron according to claim 1, wherein the flake graphite cast iron has a structure containing at least one kind of base selected from the group consisting of pearlite and bainite.

3. The cylindrical member made of flake graphite cast iron according to claim 1, wherein the flake graphite cast iron comprises, in terms of mass %, 0.20% or more and 0.55% or less of Mo.

4. The cylindrical member made of flake graphite cast iron according to claim 1,
wherein i) the flake graphite cast iron comprises, in terms of mass %, 0.30% or more and 0.55% or less of Mo, and
wherein ii) the flake graphite cast iron comprises, in terms of mass %, a total of 0.60% or more and 1.15% or less of Mo and Ni.

5. The cylindrical member made of flake graphite cast iron according to claim 1, wherein the flake graphite cast iron has a hardness of 102 HRB or more and 112 HRB or less, a tensile strength of 300 MPa or more, and a Young's modulus of 110 GPa or more.

6. The cylindrical member made of flake graphite cast iron according to claim 1, wherein the flake graphite cast iron comprises a carbide, and the carbide has an area ratio of 0.9% or more and 5.0% or less in a continuous region that continues by 0.2 mm or more with respect to a radial direction of the cylindrical member.

7. The cylindrical member made of flake graphite cast iron according to claim 6, wherein the continuous region has a length of 2.7 mm or less with respect to the radial direction of the cylindrical member.

8. The cylindrical member made of flake graphite cast iron according to claim 6, wherein the cylindrical member comprises an inner peripheral surface and an outer peripheral surface, any one of the inner peripheral surface and the outer peripheral surface being formed in an end portion on one side of the continuous region with respect to the radial direction of the cylindrical member.

9. The cylindrical member made of flake graphite cast iron according to claim 8, wherein the cylindrical member comprises a cylinder liner for an internal combustion engine in which the inner peripheral surface is formed on an innermost peripheral side of the continuous region with respect to the radial direction of the cylindrical member, and a piston and a piston ring reciprocate and slide on the inner peripheral surface.

10. The cylindrical member made of flake graphite cast iron according to claim 8, wherein the cylindrical member comprises a brake drum of an internally expanding drum brake in which the inner peripheral surface is formed on an innermost peripheral side of the continuous region with respect to the radial direction of the cylindrical member, and the brake drum slides on a brake shoe on the inner peripheral surface.

11. A cylindrical member made of flake graphite cast iron, the flake graphite cast iron comprising a composition containing, in terms of mass %, 2.85% or more and 3.35% or less of C, 1.95% or more and 2.55% or less of Si, 0.45% or more and 0.8% or less of Mn, 0.03% or more and 0.25% or less of P, 0.15% or less of S, 0.15% or more and 0.55% or less of Cr, 0.15% or more and 0.65% or less of Mo, 0.15% or more and 0.65% or less of Ni, 0.05% or more and 0.55% or less of Cu, and the balance of Fe and inevitable impurities, wherein the cylindrical member has a thickness of 3.5 mm or less.

12. The cylindrical member made of flake graphite cast iron according to claim 11, wherein the flake graphite cast iron has a structure containing at least one kind of base selected from the group consisting of pearlite and bainite.

13. The cylindrical member made of flake graphite cast iron according to claim 11, wherein the flake graphite cast iron comprises, in terms of mass %, 0.20% or more and 0.55% or less of Mo.

14. The cylindrical member made of flake graphite cast iron according to claim 11,
wherein i) the flake graphite cast iron comprises, in terms of mass %, 0.30% or more and 0.55% or less of Mo, and
wherein ii) the flake graphite cast iron comprises, in terms of mass %, a total of 0.60% or more and 1.15% or less of Mo and Ni.

15. The cylindrical member made of flake graphite cast iron according to claim 11, wherein the flake graphite cast iron has a hardness of 102 HRB or more and 112 HRB or less, a tensile strength of 300 MPa or more, and a Young's modulus of 110 GPa or more.

16. The cylindrical member made of flake graphite cast iron according to claim 11, wherein the flake graphite cast iron comprises a carbide, and the carbide has an area ratio of 0.9% or more and 5.0% or less in a continuous region that continues by 0.2 mm or more with respect to a radial direction of the cylindrical member.

17. The cylindrical member made of flake graphite cast iron according to claim 16, wherein the continuous region has a length of 2.7 mm or less with respect to the radial direction of the cylindrical member.

18. The cylindrical member made of flake graphite cast iron according to claim 16, wherein the cylindrical member comprises an inner peripheral surface and an outer peripheral surface, any one of the inner peripheral surface and the outer peripheral surface being formed in an end portion on one side of the continuous region with respect to the radial direction of the cylindrical member.

19. The cylindrical member made of flake graphite cast iron according to claim 18, wherein the cylindrical member comprises a cylinder liner for an internal combustion engine in which the inner peripheral surface is formed on an innermost peripheral side of the continuous region with respect to the radial direction of the cylindrical member, and a piston and a piston ring reciprocate and slide on the inner peripheral surface.

20. The cylindrical member made of flake graphite cast iron according to claim 18, wherein the cylindrical member comprises a brake drum of an internally expanding drum brake in which the inner peripheral surface is formed on an innermost peripheral side of the continuous region with respect to the radial direction of the cylindrical member, and the brake drum slides on a brake shoe on the inner peripheral surface.

* * * * *